United States Patent
Dixon et al.

(10) Patent No.: US 9,194,369 B2
(45) Date of Patent: Nov. 24, 2015

(54) CONTROL OF A WIND TURBINE, ROTOR BLADE AND WIND TURBINE

(75) Inventors: Kristian Robert Dixon, Boulder, CO (US); Siegmund Düll, München (DE); Per Egedal, Herning (DK); Thomas Esbensen, Herning (DK); Volkmar Sterzing, Neubiberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 700 days.

(21) Appl. No.: 13/550,723

(22) Filed: Jul. 17, 2012

(65) Prior Publication Data
US 2013/0022464 A1    Jan. 24, 2013

(30) Foreign Application Priority Data
Jul. 19, 2011    (DE) .......................... 10 2011 079 432

(51) Int. Cl.
*F03D 1/06* (2006.01)
*F03D 7/02* (2006.01)

(52) U.S. Cl.
CPC .............. *F03D 7/022* (2013.01); *F03D 1/0675* (2013.01); *F05B 2240/30* (2013.01); *Y02E 10/721* (2013.01); *Y02E 10/723* (2013.01)

(58) Field of Classification Search
CPC .......................... F03D 7/0675; F05B 2270/709
USPC ............................. 416/1, 36, 37, 41, 90 R, 92
See application file for complete search history.

(56) References Cited

U.S. PATENT DOCUMENTS

| | | | |
|---|---|---|---|
| 5,791,601 A | 8/1998 | Armanios | |
| 7,909,575 B2* | 3/2011 | Barbu et al. | 416/61 |
| 8,616,846 B2* | 12/2013 | Nanukuttan et al. | 416/1 |
| 2007/0231151 A1* | 10/2007 | Herr et al. | 416/229 A |

(Continued)

FOREIGN PATENT DOCUMENTS

| | | |
|---|---|---|
| DE | 19534404 A1 | 3/1997 |
| DE | 102008002897 A1 | 1/2009 |
| JP | 2003254226 A | 9/2003 |

OTHER PUBLICATIONS

Daniel Schneegβ et al: "Improving Optimality of neural rewards Regression for Data-Efficient Batch Near-Optimal Policy Identification" Artificial Neural Networks ä ICANN 2007; (Lecture notes in computer science), Springer Berlin Heidelberg, vol. 4668, Sep. 9, 2007, pp. 109-118, XP019069348; Others.

(Continued)

*Primary Examiner* — Igor Kershteyn
*Assistant Examiner* — Woody A Lee, Jr.

(57) ABSTRACT

A wind turbine rotor blade is equipped with an air chamber and equipped via the air chamber to route a modulation beam out of the rotor blade such that the air current along the rotor blade is changed. Thereby the laminar current is changed into a turbulent current on the one hand and its detachment and on the other hand its recreation is achieved in order to produce the laminar current. The control may occur via electrostatic actuators via a learnable control strategy based on neural forecasts, which take the complexity of the non-linear system into account and allow for the plurality of influencing factors. The stress on the rotor blades may be reduced, resulting in longer service life and reduced maintenance costs, a higher level of efficiency or quieter operation.

17 Claims, 3 Drawing Sheets

(56) References Cited

U.S. PATENT DOCUMENTS

| | | | |
|---|---|---|---|
| 2010/0076614 A1* | 3/2010 | Nies et al. | 700/287 |
| 2010/0135795 A1* | 6/2010 | Nies et al. | 416/1 |
| 2010/0143122 A1* | 6/2010 | Nies et al. | 416/1 |
| 2011/0103950 A1 | 5/2011 | Haans | |

OTHER PUBLICATIONS

Anton Maximilian Schaefer et al: "A Neural Reinforcement Learning Approach to Gas Turbine Control" Neural Networks, 2007. IJCNN 2007. International Joint Conference on, IEEE, Piscataway, NJ, USA, Aug. 1, 2007, pp. 1691-1696; Others.

Martin Riedmiller: Neural Fitted Q Iteration—First Experiences with a Data Efficient Neural Reinforcement Learning Method. ECML 2005: 317-328; Others.

Zimmermann H. G., Neuneier R., Grothmann R.: Modeling of Dynamical Systems by Error Correction Neural Networks, in: Modeling and Forecasting Financial Data, Techniques of Nonlinear Dynamics, Eds. Soofi, A. and Cara, L., Kluwer Academic Publishers, 2002, pp. 237-263; Book.

A.M. Schaefer, S. Udluft, and H.-G. Zimmermann. A Recurrent Control Neural Network for Data Efficient Reinforcement Learning. In Proc. of the IEEE International Symposium on Approximate Dynamic Programming and Reinforcement Learning, 2007; Others.

H. G. Zimmermann, R. Grothmann, A. M. Schaefer und Ch. Tietz: "Identification and Forecasting of Large Dynamical Systems by Dynamical Consistent Neural Networks" in "New Directions in Statistical Signal Processing: From Systems to Brain", MIT Press, 2006, pp. 203-242; Book.

* cited by examiner

CONTROL OF A WIND TURBINE, ROTOR BLADE AND WIND TURBINE

CROSS REFERENCE TO RELATED APPLICATIONS

This application claims priority of German Patent Office application No. 10 2011 079432.8 DE filed Jul. 19, 2011. All of the applications are incorporated by reference herein in their entirety.

FIELD OF INVENTION

The disclosure relates to a method for controlling a wind turbine, a rotor blade, which enables a corresponding control and an apparatus for controlling at least one rotor blade. Furthermore, a wind turbine having at least one such rotor blade and/or at least one such control apparatus is also proposed.

BACKGROUND OF INVENTION

The service life of a rotor blade of a wind turbine is to a large extent dependent on the strength of the cyclical stresses acting on the rotor blade based e.g. on wind shears, turbulences and initial conditions. High stresses in the form of deflections of the rotor blades are herewith unwanted, particularly if states with a high stress alternate in real-time with states without stress or even with states with inverse stress (dynamic alternating stresses). For instance, alternating deflections due to excitation with a resonance frequency or on account of the alternating wind speeds as a function of the position of the rotor blade result in particularly significant weathering of the rotor blade.

A rotor blade of a wind turbine must typically withstand millions of stress cycles, which result in gradual wear of the rotor blade and reduce the remaining service life. It is herewith disadvantageous if the afore-cited particularly strong stresses drastically shorten the service life of the wind turbine.

It is known to change a pitch of the rotor blade of the wind turbine. This results in a change in the output produced by the wind turbine. In particular, the rotor blades of the wind turbine may be tilted individually. However, the imminent stress on the rotor blade is not known in advance and a tilting of the rotor blade, which has a weight of 10 tonnes or more for instance, requires energy and time. In addition, it is disadvantageous that such an adjustment of the rotor bade itself effects a considerable stress on and wear associated therewith of the bearing of the rotor blade and the tilting actuators, which in turn has a negative effect on the service life of the system and on the necessary maintenance of the wind turbine.

It is furthermore known to use one of the following methods as a learning algorithm for instance:
- an NFQ method ("Neural Fitted Q Iteration", see: M. Riedmiller: Neural Fitted Q Iteration—First Experiences with a Data Efficient Neural Reinforcement Learning Method. In Proc. of the European Conf. on Machine Learning, 2005),
- an RCNN ("Recurrent Control Neural Network", see: A.M. Schaefer, S. Udluft, and H.-G. Zimmermann. A Recurrent Control Neural Network for Data Efficient Reinforcement Learning. In Proc. of the IEEE International Symposium on Approximate Dynamic Programming and Reinforcement Learning, 2007; or A. M. Schäfer, D. Schneegaβ, V. Sterzing, and S. Udluft. A Neural Reinforcement Learning Approach to Gas Turbine Control. International Joint Conference on Neural Networks, 2007) and/or
- a PGNRR method ("Policy Gradient Neural Rewards Regression", see: D. Schneegaβ, S. Udluft, and Th. Martinetz Improving Optimality of Neural Rewards Regression for Data-Efficient Batch Near-Optimal Policy Identification. In Proc. of the International Conf. on Artificial Neural Networks, 2007).

SUMMARY OF INVENTION

It may be desirable to avoid the afore-cited disadvantages and create an efficient solution in order to reduce particularly strong stresses on the wind turbine and/or its rotor blades and to reduce inverse stresses and thus to extend the service life of the wind turbine system and/or reduce maintenance costs.

To this end, a method for controlling a wind turbine having at least one rotor blade is specified,
- in which a modulation beam is routed out of at least one chamber of the rotor blade in order to change an air flow along the rotor blade.

The modulation beam is for instance a control beam for influencing the aerodynamic boundary layer. An active control of the air flow is thus proposed in order to reduce the stress on the rotor blades of a wind turbine.

An actuator may therefore manipulate the application of the air current along the rotor blade, the aerodynamic drive generated therewith and the stress on the rotor blade associated therewith.

The solution presented here uses in particular an active control of the air flow (also referred to as "Active How Control", AFC) along the rotor blade of the wind turbine. This type of active control enables the ascending force of the rotor blade to be influenced without a (rapid) movement and/or acceleration of large masses, e.g. of the rotor blade or a part thereof.

The approach is resistant to interferences and extremely energy-efficient. The (pulsing) air flow may leave at different angles with or contrary to the base current corresponding to the rotation. A partially detached current may thus be applied (increase the blade stress and aerodynamic efficiency) and/or an adjacent current for detachment (reducing the aerodynamic efficiency of the profile and thus of the blade stress). This may be selectively controlled and regulated in order for instance to control a stress distribution and/or to alleviate the effect of turbulences, gusts of wine or shear winds.

The control by means of the air flow may take place for instance in an outer area of the rotor blade. This is advantageous because the stress in the vicinity of the tip of the rotor blade has the largest effect on the bending moment at the root of the rotor blade.

It is therefore possible to significantly reduce the stresses during operation of the wind turbine. In particular, oscillations which have a negative effect on the service life of the rotor blade are reduced or prevented.

In particular, the chamber may be embodied sealed toward a supply line and the opening for leading through the modulation beam. In this way, a suitably pulsing modulation beam is generated instead of a continuous modulation beam, said pulsing modulation beam being drawn in and ejected in a targeted fashion.

One development is that the modulation beam runs from the rotor blade essentially in the direction of an air flow running along the rotor blade.

In particular, the modulation beam is thus routed out of the chamber of the rotor blade such that the air flow (once again)

runs in a laminar fashion along the rotor blade (in the form of a laminar current without an aerodynamic stall). For instance, a current detachment may be reduced by means of this modulation beam and the strength of the boundary layer may be reduced. This increases the ascending force of the rotor blade and may counteract a strong inverse stress on the rotor blade.

It is noted here that the outlet direction of the modulation beam may be aligned.

One development is in particular that the modulation beam runs out of the rotor blade essentially counter to a direction of an air flow running along the rotor blade.

The modulation beam may therefore effect a stall in the current along the rotor blade. This herewith reduces the lifting force on the rotor blade and thus the stress on the rotor blade.

It is also a development that a volume of the chamber is changed by means of an electrical voltage (electrostatically), particularly by way of an electrically operable actuator.

Additionally it is one development that with the aid of a nonlinear model learned from data, in particular a neural network, in particular as a function of further influence variables, an intensity, a start and/or a duration of an expected change in stress on the at least one rotor blade is forecast.

The aerodynamic effect of the modulation beam does not occur immediately but is instead delayed. This delay is in particular not constant, but instead depends nonlinearly and stochastically on further variables, e.g. the rotor speed, the wind strength, the blade pitch, the turbine alignment relative to the wind, the air density and turbulence as well as further factors. These factors influence the duration and effectiveness of the modulation beam.

A next development consists therefore in learning a strategy for forecasting, planning and controlling the modulation beam and in accordance with this strategy the modulation beam is controlled.

Recurrent neural networks such as the following are used in particular to forecast non-linear models, e.g. neural networks:
- an ECNN (cf. H. G. Zimmermann, R. Neuneier and R. Grothmann: "Modeling of Dynamical Systems by Error Correction Neural Networks" in "Modeling and Forecasting Financial Data, Techniques of Nonlinear Dynamics", A. Soofi and L. Cao, Kluwer Academic Publishers, pages 237-263, 2002) or
- a DCNN (cf. H. G. Zimmermann, R. Grothmann, A. M. Schaefer ad Ch. Tietz: "Identification and Forecasting of Large Dynamical Systems by Dynamical Consistent Neural Networks" in "New Directions in Statistical Signal Processing: From Systems to Brain", MIT Press, 2006, pages 203-242).

An NFQ method, an RCNN or a PGNRR method may be used for instance to learn the control strategy. Such learning may take place based on collected parameters and/or measured variables and the learned strategy may (after a learning phase) be used to control the chambers. Control may take place independently for each chamber and/or for each rotor blade of the wind turbine.

The learning process may take place in consideration of or based on a suitable modeling, e.g. an RNN for a stress prediction and/or a neural network for evaluating a stress state and a wind state.

One embodiment is that at least one of the following parameters is taken into account in the strategy for controlling the modulation beam:
- a stress on the rotor blade;
- a deflection of the rotor blade;
- a blade pitch;
- a rotor speed;
- a turbine alignment relative to the wind
- a wind speed;
- shear winds;
- an air density;
- a temperature;
- turbulences or conditions which may result in turbulences.

The parameters may be measured or derived from measured variables. It is also possible for at least one parameter to be learned and/or modeled on the basis of other available parameters or measured variables for instance. It is therefore possible to learn the effect of an active current regulation and to correspondingly control the wind turbine (e.g. the actuators of the rotor blades) in terms of time and strength.

Learning methods, e.g. neural networks and reinforcement learning, may be used for instance to suitably map and/or model a dynamic of the active influence of the air flow (AFC) and non-linear dependencies with surrounding air flows, air flows along the rotor blade and bends in the rotor blade.

A further development is that the rotor blade has several chambers, which are each controlled mutually or separately from one another.

Within the scope of an additional development, the chamber has a volume, which is arranged at least partially between two metallic surfaces and which is changed and/or adjusted by means of an electrostatic effect by way of an electrical voltage.

Air chambers within the rotor blade, which may be embodied for instance by layers of electrically conducting materials arranged one above the other, allow for the generation of air pulses, by a (high voltage) signal being used by utilizing the electrostatic effect in order to change the volume of the air chambers.

An alternative embodiment consists in the modulation beam being generated continuously or in a pulsed fashion.

A next embodiment is that a modulation beam is routed via a valve from at least one chamber of the rotor blade.

It is also an embodiment that the modulation beam is generated with the aid of air which reaches the chamber via a supply line,
- wherein the supply line is fed with compressed air via the hub of the wind turbine and/or
- wherein the supply line is fed with air via a supply opening in the rotor blade.

A rotor blade is disclosed
- comprising a chamber, which may be supplied with air via a supply line,
- comprising an actuator, with the aid of which the volume of the chamber may be adjusted (e.g. rapidly changed),
- an opening, with the aid of which the chamber is connected to the outer space.

The chamber may be connected to the outer space by means of a series of short gaps, with the aid of which a targeted air jet may be generated.

The afore-described features may be combined accordingly with this apparatus.

One development consists in the actuator including electrically conductive materials arranged one above the other, with the aid of which a modulation beam may be generated by an electrical voltage being used by utilizing the electrostatic effect in order to (rapidly) change the volume of the chamber.

It is also a development that the chamber is connected via the opening to the outer space by way of a valve.

An apparatus for controlling at least one wind turbine with at least one rotor blade in each instance is also proposed, including a processing unit, which is configured such that a modulation beam may be routed out of at least one chamber of the rotor blade in order to change an air flow along the rotor blade.

A wind turbine is also proposed, which has at least one of the rotor blades described here.

Furthermore, a wind turbine and/or a system having at least one wind turbine is proposed, which comprises at least one control apparatus as described here.

The processing unit cited here may be embodied in particular as a processor unit and/or one at least partially fixedly wired or logical circuit arrangement, which is set up for instance such that the method may be implemented as described herein. Said processing unit may be or include any type of processor or calculator or computer with correspondingly necessary peripheral devices (memory, input/output interfaces, input/output devices etc.).

The afore-described explanations relating to the method apply to the apparatus accordingly. The apparatus may be embodied in one component or distributed into several components. In particular, part of the apparatus may also be connected by way of a network interface (e.g. the internet).

The solution proposed herein further includes a computer program product, which may be loaded directly into a memory of a digital computer, including program code parts which are suited to implementing steps of the method described here.

Furthermore, the afore-cited problem is achieved by means of a machine-readable storage medium, e.g. any memory, including instructions which may be executed by a computer (e.g. in the form of program codes) which are suited to the computer implementing the steps of the method described here.

BRIEF DESCRIPTION OF THE DRAWINGS

The afore-described properties, features and the manner in which these are achieved become more clearly and more distinctly understandable in conjunction with the following illustrated embodiments, which are explained in more detail in conjunction with the drawings. Identical or identically acting elements may be provided in this way with the same reference characters.

DETAILED DESCRIPTION OF INVENTION

Figure 1:
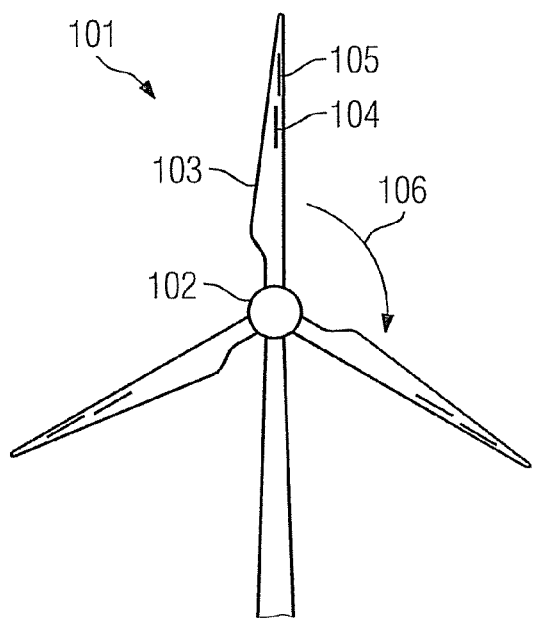
FIG. 1 shows a schematic representation of a wind turbine with three rotor blades, which are fastened to a hub and/or to a rotor head.

The present approach proposes providing an actuator to adjust the current on a rotor blade, wherein a strategy for setting the flow may be learned and in accordance with this strategy the actuation may be controlled.

The strategy considers in particular at least one of the following parameters:
a stress on the rotor blade;
a deflection of the rotor blade;
a blade pitch;
a rotor speed;
a turbine alignment relative to the wind;
a wind speed;
shear winds;
an air density;
a temperature;
turbulences or conditions which may result in turbulences.

The preceding parameters may be measured directly or derived from measured variables. It is also possible for at least one parameter to be learned and/or modeled e.g. based on (at least one) other available parameters or measured variables.

On the basis of the cited parameters, an (if necessary non-linear) model may be used in order to introduce a pulsing or (essentially) continuous air flow into the low pressure side of the rotor blade profile. A modulation beam (as an air flow) is then produced, which may be routed counter to the general air flow and causes the laminar air flow on the surface of the rotor blade to stall and thus reduces the lifting force on the rotor blade and thus the stress on the rotor blade.

It is alternatively possible for the modulation beam to be used such that detachment of the air flow is prevented and an already detached air flow applies again to the profile. This increases the ascending force of the rotor blade and may counteract a strong inverse stress on the rotor blade.

The modulation beam may optionally be activated in a pulsing fashion, by for instance a pulsed high voltage signal being applied to parallel metallic surfaces, which may move toward or away from one another on the basis of the electrostatic effect. As a result, a pressure may be rapidly increased and/or reduced in a chamber between the charged surfaces and thus the desired modulation beam and/or a pulse of the modulation beam may be generated.

The actuators may be distributed on several areas of the rotor blade. In particular, smaller actuators may be provided, which are essentially operated in parallel and/or simultaneously with one another.

In order to increase the efficiency of the modulation, the detaching modulation beam may instead be used at the end of the rotor blade, and the applied modulation beam may be offset approximately in the direction of the hub.

For instance, a backflow of an air flow into the chamber may be prevented by means of a valve. The modulation beam may reach the chamber via an opening in a leading edge of the rotor blade, in particular on or in the vicinity of the tip of the rotor blade.

It is also an option for pressurized air to be provided via the hub of the wind turbine.

The modulation beam may also interact with the turbulent air flow in the vicinity of the rotor blade.

It is particularly advantageous to use a model based on an approach for reinforcement learning in order to learn an optimized control strategy from operating data.

The solution proposed here uses in particular an active control of the air flow along the wind turbine. This type of active control enables influence of the ascending force of the rotor blade without a (rapid) movement and/or acceleration of large masses, e.g. rotor blade or part thereof.

Learning methods, e.g. neural networks and reinforcement learning may be used to suitably map and/or model a dynamic of the active air flow control as well as non-linear dependencies with surrounding air flows, air flows along the rotor blade and bends in the rotor blade.

Air chambers inside the rotor blade, which may be embodied for instance by means of layers of electrically conductive materials arranged one above the other, allow generation of air pulses, by a high voltage signal being used by utilizing the electrostatic effect in order to change the volume of the air chambers.

This approach is resistant to interferences and markedly energy-efficient. The (pulsing) air flow may escape at different angles and act on the outer air flow (powering the wind turbine) in order for instance to control a stress distribution and/or to alleviate the effect of turbulences, gusts of wind or shear winds.

The described method may additionally be used to
increase the aerodynamic efficiency of the profile, of the rotor blade and thus of the overall wind turbine by means of the predominantly adherently acting modulation beams;
achieve a reduction in the noise emissions associated with the turbulent flow detachment and thus to operate wind turbines more quietly.

The control by means of the (pulsing) air flow need not in this way take place through the entire length of the rotor blade, but instead for instance in an outer area of the rotor blade. This is advantageous because the stress in the vicinity of the tip of the rotor blade has the largest effect on the bending moment at the root of the rotor blade.

FIG. 1 shows a schematic representation of a wind turbine 101 having three rotor blades, wherein one of the rotor blades 103 is taken into consideration below. The rotor blades are fastened to a hub and/or to a rotor head 102. By way of example, FIG. 1 shows a direction of rotation 106 of the wind turbine produced by the wind.

The rotor blade 103 has chambers 104, 105, with the aid of which an air flow may be routed to the surface of the rotor blade by way of openings. This is described in more detail below.

Figure 2:
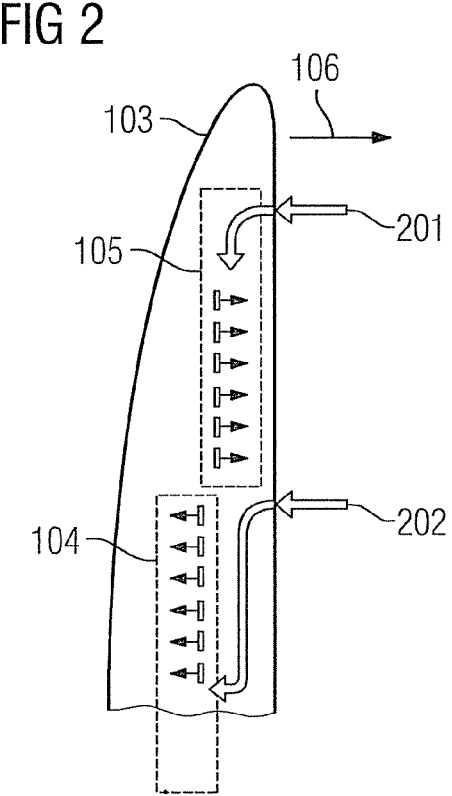
FIG. 2 shows a schematic cut out of the rotor blade with the chambers.

FIG. 2 shows a schematic cutout of the rotor blade 103 having chambers 104 and 105. With the aid of the manipulation of air flows out of the chambers 104 and 105 as explained below, it is possible to influence the stress and/or bend acting on the rotor blade 103 and in particular to counteract disadvantageous stresses on the rotor blade 103.

By way of example, an air flow 201 is routed from the outside into the chamber 105. The size and/or volume of the chamber 105 may be adjusted by means of an electrical voltage $U_{CU}$. By way of example, two metallic plates which may be adjusted relative to one another may to this end be moved toward or away from one another by way of the voltage $U_{CU}$, with the aid of the electrostatic effect, thereby rapidly changing and/or adjusting the volume of the chamber 105. In the example shown in FIG. 2, an aerodynamic stall in the current along the rotor blade 103 is effected by means of the chamber 105.

An air flow 202 is guided into the chamber 104 from the outside. The volume and/or the size of the chamber 104 may likewise be rapidly adjusted by means of an electric voltage $U_{CL}$. According to the preceding explanations and by utilizing the electrostatic effect, it is possible by way of the voltage $U_{CL}$ for an excess pressure and thus an exiting air jet and its effect for a laminar circulation to develop again and the outer air flow onto the rotor blade 103 to be used.

It should be noted here that the volume of the chambers 104, 105 is adjusted by way of example by utilizing the electrostatic effect. Other mechanisms are also possible, e.g. by means of electrical actuators, in order to influence the volume of the chambers 104, 105 e.g. with the aid of an electrical energy.

Figure 3:
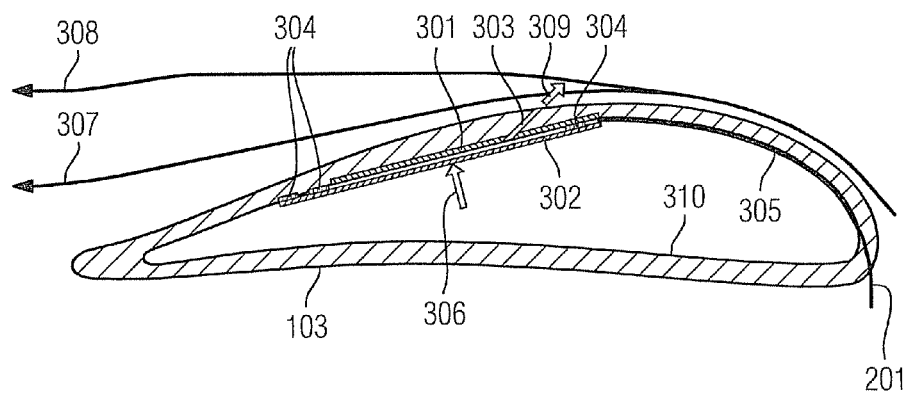
FIG. 3 shows a schematic section through the rotor blade, wherein the modulation beam from the chamber of the rotor blade effects a stall in the air flow guided in a laminar fashion along the rotor blade.

FIG. 3 shows a schematic representation of a section through the rotor blade 103. A metallic surface 301, e.g. an electrically conductive coating or a metal strip is provided on an inner wall 310 of the rotor blade 103, in the edge regions of which several separators 304 are arranged and an insulated metallic membrane 302 is found across the separators 304. This arrangement comprising metal surface 301, separators 304 and insulated metallic membrane 302 produces a chamber, the volume of which may be changed 306 by applying an electrical voltage $U_{CU}$ on account of the electrostatic effect.

This chamber has an opening 303 in the outer space (into the outer surroundings of the rotor blade 103) so that by applying the electrical voltage $U_{CU}$, the volume of the chamber may be reduced and a modulation beam 309 (air flow) may be guided outwards through the opening 303. On account of the electrical voltage $U_{CU}$, the following force F herewith acts on the air volume stored in the chamber:

$$F = C \cdot \frac{U_{CU}^2}{d},$$

wherein C refers to a capacitance and d a distance between the metallic membrane 302 and the metal surface 301.

The opening 303 is aligned such that the modulation beam 309 effects a stall in a current. In particular, the modulation beam 309 is aligned counter to the air flow 307 applied to the rotor blade. This results in the laminarly adherent air current 307 stalling and being converted into a turbulently detached air flow 308. The stress on the rotor blade 103 may herewith be reduced.

The air flow 201 is guided along a guide 305 into the chamber, in other words the space between the metallic membrane 302 and the metal surface 301. To this end a further opening may be provided for instance, by way of which air may enter the interior of the rotor blade 103.

Figure 4:
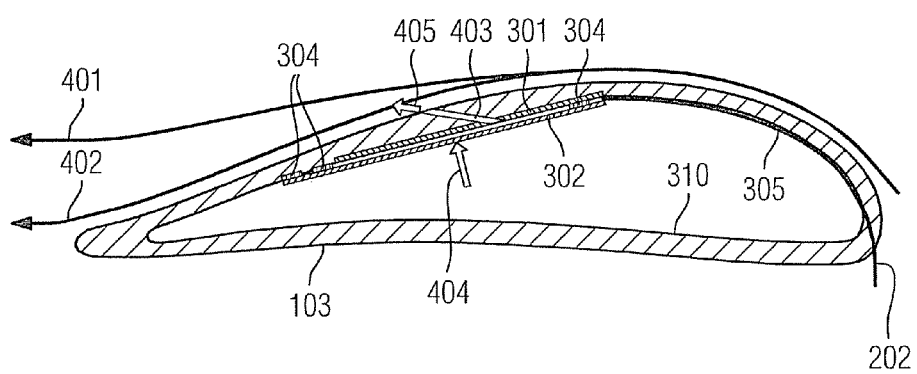
FIG. 4 shows a schematic representation of a section through the rotor blade, wherein the case contrary to FIG. 3 is illustrated, i.e. that an air flow, which does not run across the entire length of the profile in a laminar fashion along the rotor blade, is influenced such that on account of a suction effect, a laminar air flow is also produced at least across a further area.

FIG. 4 likewise shows a schematic representation of a section through the rotor blade 103, wherein the reverse case is illustrated here, i.e. in that an air flow 401, which does not run in a laminar fashion along the rotor blade 103, is influenced such that on account of a suction effect, a laminar air flow 402 also results at least partially and for a specific period of time.

This may be achieved for instance in that the arrangement described according to FIG. 3 has an opening 403, which is aligned such that a modulation beam 405 (air flow) is blown out of the chamber, which causes the air flow 402 to run in a laminar fashion along the outer surface of the rotor blade 103 after a short period of time. The opening 403 is embodied for instance such that the modulation beam 405 is aligned in the direction of the air flow 401, 402.

The chamber otherwise largely corresponds to the embodiment according to FIG. 3. The volume of the chamber may be changed 404 by applying an electrical voltage $U_{CL}$ on account of the electrostatic effect. By applying the electrical voltage $U_{CL}$, the volume of the chamber is reduced and the modulation beam 405 is guided outwards through the opening 403. A force F caused by the electrical voltage $U_{CL}$ herewith acts on the air volume stored in the chamber:

$$F = C \cdot \frac{U_{CL}^2}{d},$$

wherein C is a capacitance and d is a distance between the metallic membrane 302 and the metal surface 301.

The air flow 202 is guided along a guide 305 into the chamber, in other words the space between the metallic membrane 302 and the metal surface 301. To this end, a further opening may be provided for instance, by way of which air may reach the interior of the rotor blade 103.

It should be noted here that the chamber 105 may be embodied to realize an aerodynamic stall according to FIG. 3, and the chamber 104 may be embodied to realize a laminar current according to FIG. 4.

Furthermore, the modulation beams 309, 405 may be continuous air flows or pulsing air flows. In particular, the chamber may provide a pulsing air flow by controlling the same with a suitable oscillating voltage.

For instance, a backflow of an air flow into the chamber may be prevented by means of a valve (not shown).

Figure 5:
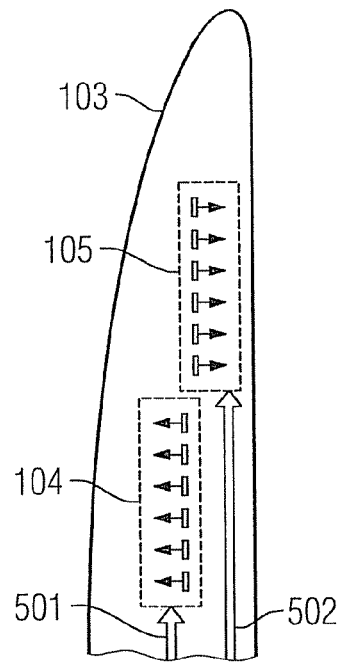
FIG. 5 shows a schematic cutout of the rotor blade, wherein the chamber is fed from the hub or the rotor head of the wind turbine.

FIG. 5 shows a schematic cutout of the rotor blade 103 with the chambers 104 and 105, wherein the chamber 104 and chamber 105 are fed by an air flow 501 and an air flow 502 respectively. The air flows 501 and 502 may be guided by the hub or the rotor head of the wind turbine into the chambers 104, 150. Compressed air may therefore be provided in the form of modulation beams by way of the wind turbine for instance. It is also possible for the air flows 501, 502 to be embodied separately or together.

The wind turbine may therefore also be controlled in particular by taking account of control of the modulation beams 309, 405. A dead time may herewith be taken into consideration which is necessary, before a started control by means of the modulation beam displays an effect. For instance, a specific time may pass until the stress on the rotor blade changes on account of the modulation beams. This period of time may be taken into consideration in order to prevent an unsuitable or excessively strong control.

The movement of the rotor blade itself underlies for instance a plurality of different influencing variables. This is preferably taken into consideration by means of a suitable modeling. In particular, the following parameters may also be taken into account when controlling the modulation beams:
 speed of the tip of the rotor blade;
 angle of inclination of the rotor blade;
 wind speed;
 speed of the rotor;
 alignment of the wind turbine relative to the wind direction.

These parameters may be learned for instance by means of the model.

One of the following methods may be used for instance as a learning algorithm:
 an NFQ method,
 an RCNN and/or
 a PGNRR method.

It is thus possible to determine the voltages for controlling the modulation beams on the basis of an RCNN, wherein for example
 (a) a stress on the rotor blade,
 (b) a wind state,
 (c) an expected maximum deflection or bend in the rotor blade are taken into consideration as input parameters.

The stress on the rotor blade (a) and the wind state (b) may be modeled by means of a neural network with Markov states as a function of the following parameters:
 blade pitch,
 rotational speed (e.g. rotations per minute),
 alignment of the turbine relative to the wind direction,
 wind speed,
 acceleration values and directions of the nacelle of the wind turbine;
 turbulence of the wind;
 shear winds.

The expected maximum deflection or bend in the rotor blade (c) is forecast for instance by means of a recurrent neural network (RNN) by taking at least one of the following parameters into account:
 stress on the rotor blade;
 angle of inclination of the rotor blade;
 rotational speed;
 wind speed
 air density.

These parameters are taken into consideration at least partially (or all) for a predetermined period of time, i.e. in particular through a time interval so that past values may also influence the modeling.

Figure 6:
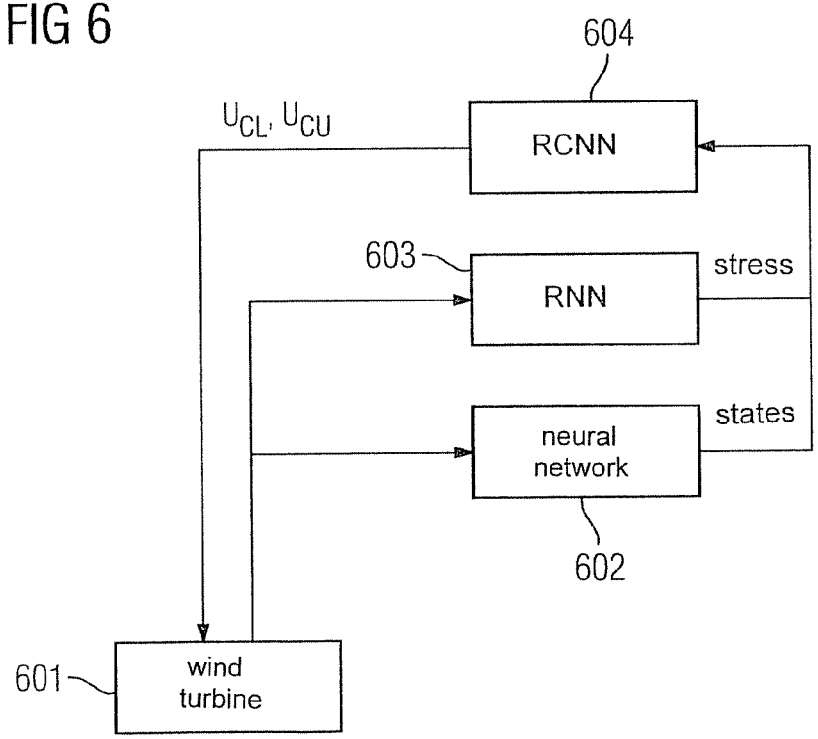
FIG. 6 shows a schematic diagram, which illustrates control of a wind turbine in particular by means of the stresses for controlling the modulation beams detailed here.

FIG. 6 shows a schematic diagram, which illustrates control of a wind turbine 601 in particular by means of the voltages for controlling the modulation beams explained here.

Turbine and wind data is provided to an RNN 603 by the wind turbine 601, said RNN determining a prediction of the stress on and/or bend for a rotor blade of the wind turbine. Furthermore, the turbine and wind data is also provided to a neural network 602, which is used as a state estimator for a stress state and a wind state. The states determined by the neural network 602 and also the stress predicted by the RNN 603 are provided to an RCNN 604, which, based on this information, determines voltages to control the chambers explained here in order to provide the modulation beams and controls the actuators of the chambers in the rotor blade of the wind turbine 601 accordingly.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for controlling a wind turbine having at least one rotor blade,
 routing a modulation beam out of a chamber of the rotor blade in order to change an air flow along the rotor blade;
 electrostatically changing a volume of the chamber via an electrical voltage, wherein the volume of the chamber is changed via electrically operable actuator; and
 wherein the volume is at least partially defined between two metallic surfaces and which is changed via an electrostatic effect of an electrical voltage.

2. The method as claimed in claim 1,
 wherein the modulation beam is routed out of the rotor blade essentially in the direction of an air flow running along the rotor blade.

3. The method as claimed in claim 1,
 wherein the modulation beam is routed out of the rotor blade essentially counter to a direction of an air flow running along the rotor blade.

4. The method as claimed in claim 1,
 forecasting from data a strength, a start and/or a duration of the expected change in stress on the at least one rotor blade with the aid of a non-linear model,
 wherein the non-linear model is provided by a neural network.

5. The method as claimed in claim 1,
learning a strategy for forecasting, planning and/or controlling the modulation; and
controlling the modulation beam in accordance with this strategy.

6. The method as claimed in claim 1,
wherein a parameter is taken into consideration in the strategy for controlling the modulation beam, the parameter selected from the group consisting of:
a stress on the rotor blade,
a deflection of the rotor blade,
a blade pitch,
a rotor speed,
a turbine alignment relative to the wind,
a wind speed,
shear winds,
an air density,
a temperature, and
turbulences or conditions which may result in turbulences.

7. The method as claimed in claim 1,
wherein the rotor blade includes several chambers, which are controlled together with one another in each instance.

8. The method as claimed in claim 1,
wherein the rotor blade includes several chambers, which are controlled separately from one another in each instance.

9. The method as claimed in claim 1,
wherein the modulation beam is generated continuously.

10. The method as claimed in claim 1,
wherein the modulation beam is pulsed.

11. The method as claimed in claim 1,
wherein the modulation beam is routed out of the chamber of the rotor blade by way of a valve.

12. The method as claimed in claim 1,
wherein the modulation beam is generated with the aid of air, which reaches the chamber by way of a supply line,
wherein the supply line is fed with compressed air by way of the hub of the wind turbine, and
wherein the supply line is fed with air by way of a supply opening in the rotor blade.

13. The method as claimed in claim 1,
wherein the modulation beam is generated with the aid of air, which reaches the chamber by way of a supply line, and
wherein the supply line is fed with compressed air by way of the hub of the wind turbine or the supply line is fed with air by way of a supply opening in the rotor blade.

14. An apparatus for controlling a wind turbine having a rotor blade according to claim 1, comprising:
a processing unit configured to change an air flow along the rotor blade via a modulation beam routed out of a chamber of the rotor blade.

15. A rotor blade, comprising:
a chamber supplied with air via a supply line;
an actuator which adjusts the volume of the chamber; and
an opening which connects the chamber to an outer surface of the rotor blade wherein the actuator includes layers of electrically conductive materials which are arranged one above the other, with the aid of which a modulation beam is generated, by an electrical voltage being used by utilizing the electrostatic effect, in order to change the volume of the chamber.

16. The rotor blade as claimed in claim 15,
wherein the chamber is connected via the opening by way of a valve.

17. A wind turbine comprising:
a rotor blade according to claim 15,
an apparatus according to claim 14.

* * * * *